United States Patent [19]

Sickler

[11] Patent Number: 5,377,886
[45] Date of Patent: Jan. 3, 1995

[54] MODULAR BICYCLE RACK FOR MOTOR VEHICLES

[76] Inventor: John R. Sickler, 14963 San Feliciano, La Mirada, Calif. 90638

[21] Appl. No.: 84,479
[22] Filed: Jul. 1, 1993
[51] Int. Cl.⁶ ............................................. B60R 7/00
[52] U.S. Cl. ..................... 224/42.45 R; 224/42.03 B; 224/42.03 R
[58] Field of Search ............... 224/42.03 B, 42.03 R, 224/42.03 A, 42.45 R

[56] References Cited

U.S. PATENT DOCUMENTS

| | | | |
|---|---|---|---|
| 3,912,139 | 10/1975 | Bowman | 224/42.45 R |
| 4,815,638 | 3/1989 | Hutyra | 224/43.03 B |
| 4,823,997 | 4/1989 | Krieger | 224/42.03 B |
| 5,129,559 | 7/1992 | Holliday | 224/42.03 B |

FOREIGN PATENT DOCUMENTS

| | | | |
|---|---|---|---|
| 1027527 | 3/1978 | Canada | 224/42.03 B |
| 41889 | 12/1981 | European Pat. Off. | 224/42.03 B |
| 4131854 | 4/1993 | Germany | 224/42.03 B |

Primary Examiner—Henry J. Recla
Assistant Examiner—David J. Walczak
Attorney, Agent, or Firm—Edgar W. Averill, Jr.

[57] ABSTRACT

An improved bicycle rack which is affixed to a square trailer hitch channel affixed to the rear of a motor vehicle. The bicycle rack has a channel for holding the bicycle rear wheel and a pair of threaded studs for holding the front fork of the bicycle. A pair of yokes hold the bicycle front wheel and the assembly is supported on a support bar which has a clamp assembly thereon. The trailer hitch has a square supported channel, removably held to the hitch channel affixed to the rear of the automobile. At least one clamp assembly is affixed to the support bar and one or more support bars with associated bicycle holding assemblies may be affixed to the square supported channel of the trailer hitch wherein up to four bicycles can be held at one time on the rack. The number may be reduced as desired so that there is no unnecessary weight or drag caused by an empty bicycle support assembly.

5 Claims, 3 Drawing Sheets

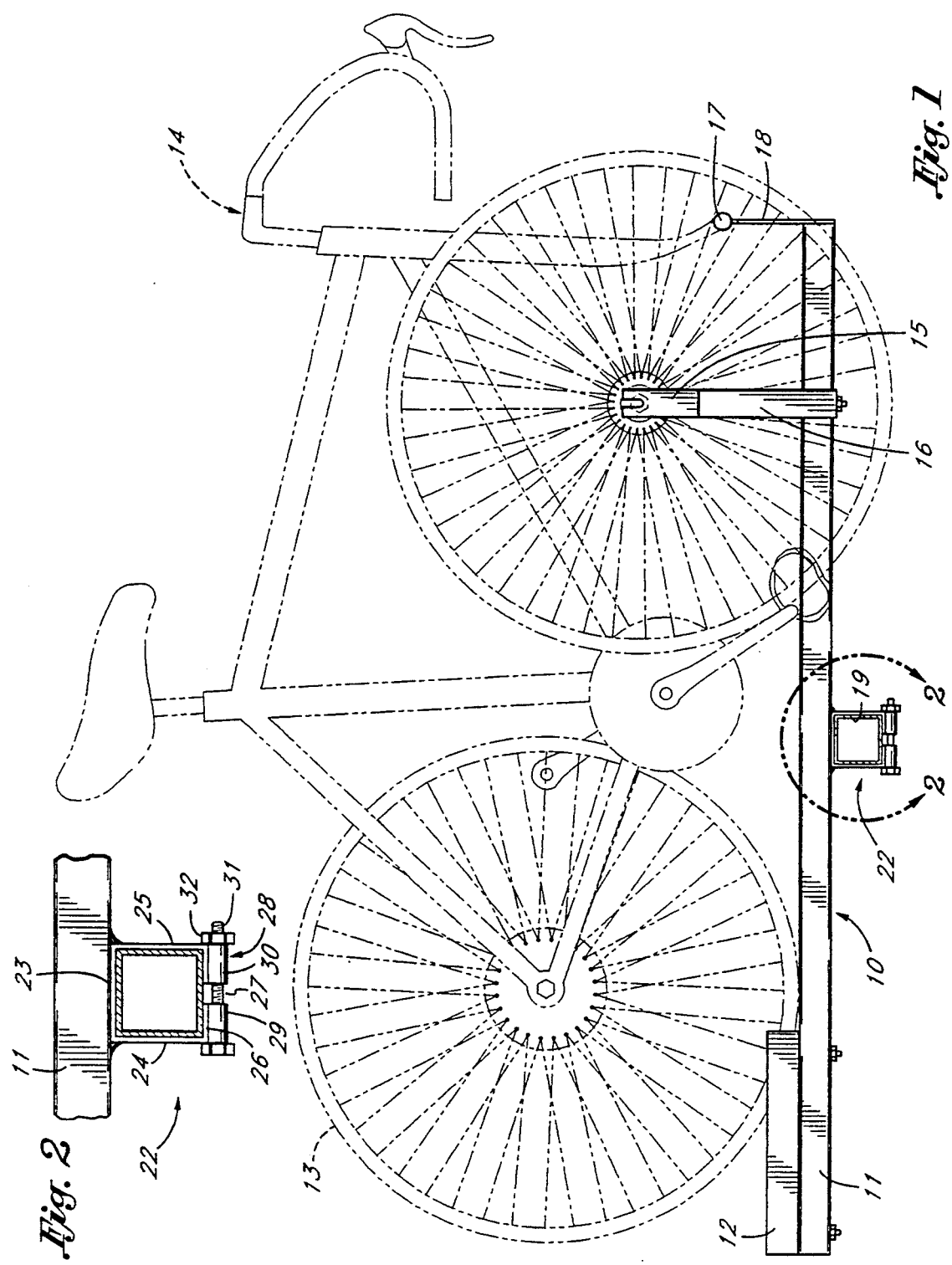

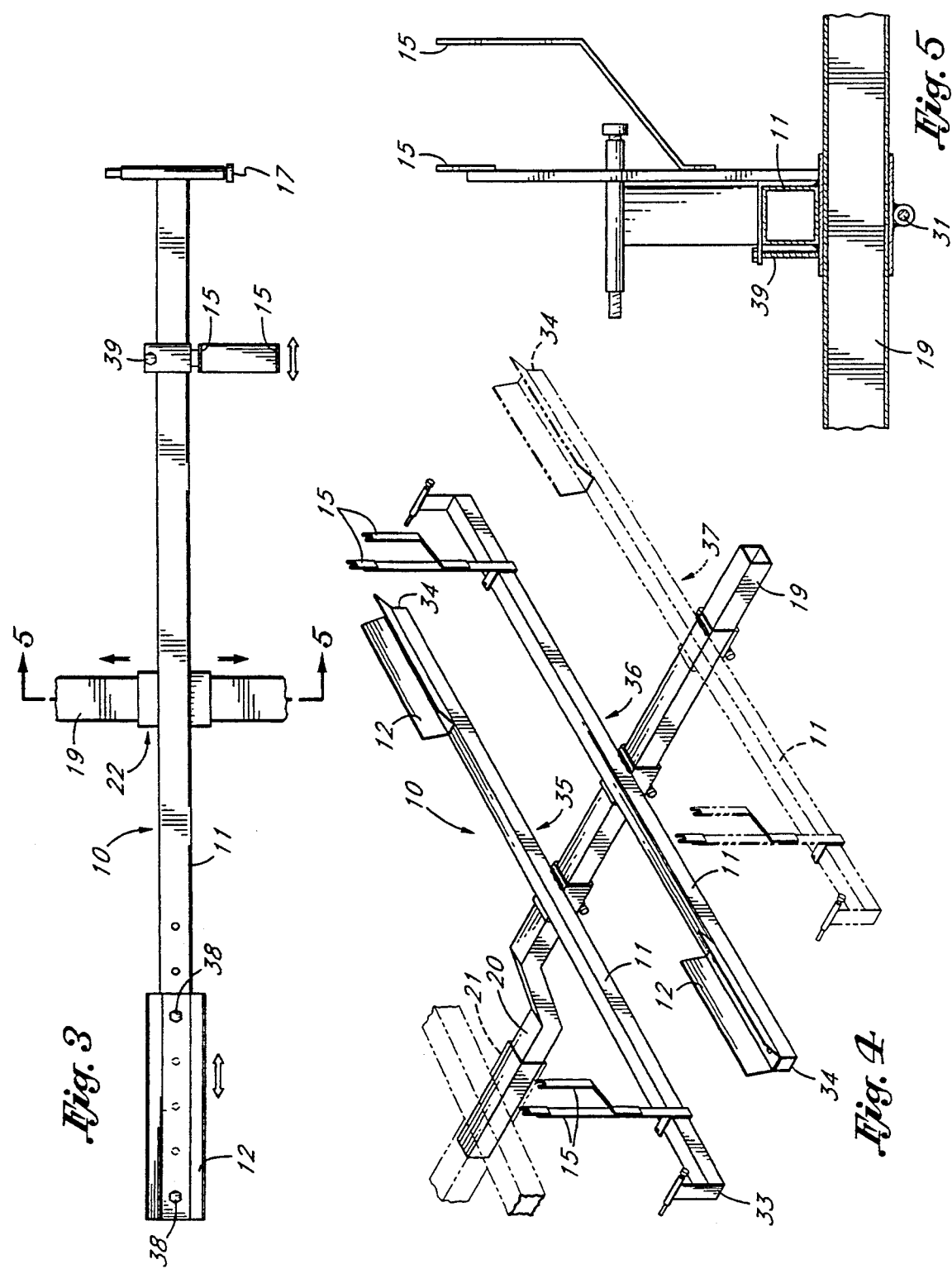

MODULAR BICYCLE RACK FOR MOTOR VEHICLES

BACKGROUND OF THE INVENTION

The field of the invention is bicycle racks for motor vehicles and the invention relates more particularly to bicycle racks of the type which have a channel for holding the rear wheel, a pair of studs for holding the front fork of the bicycle and a pair of forks for holding the front wheel of the bicycle. Such racks provide an efficient way of holding a bicycle on an automobile.

Most commonly, such bicycle racks are held on the top of the automobile which unfortunately causes a substantial amount of air resistance. A modified bicycle rack has been held by a square trailer hitch and is shown in U.S. Pat. No. 5,025,932. Other devices also held by the rear rack are shown in U.S. Pat. Nos. 4,804,120 and 4,676,414.

These bicycle racks are invariably provided in a fixed number so that, for instance, two or four racks are always provided even though only one bicycle need be carried. Conversely, many designs will only hold one bicycle which obviously is impractical if two or more bicycles need to be carried.

SUMMARY OF THE INVENTION

It is an object of the present invention to provide a modular bicycle rack which permits the addition or subtraction of bicycle racks to an automobile.

The present invention is for an improved bicycle rack of the type having a bicycle holding assembly including a support bar, a channel for a bicycle rear wheel held by said support bar, a pair of threaded studs held on a shaft supported by said support bar for a bicycle front fork, and a pair of yokes to hold a bicycle front wheel also supported on the support bar. The improvement of the present invention includes a clamp assembly held on the support bar and a trailer hitch assembly which has a square supported channel to which one or more bicycle holding assemblies can be removably affixed, and this way only the needed number of bicycle holding assemblies need be affixed to the hitch.

BRIEF DESCRIPTION OF THE DRAWINGS

FIG. 1 is a rear view of the bicycle rack of the present assembly.

FIG. 2 is an enlarged view of the portion of the assembly of FIG. 1 indicated by line 2—2.

FIG. 3 is a top view of the bicycle rack of FIG. 1.

FIG. 4 is a perspective view of three bicycle racks of FIG. 1 affixed to the bar of a trailer hitch with one of the bicycle racks being shown in phantom view.

FIG. 5 is a cross sectional view taken along 5—5 of FIG. 3.

DESCRIPTION OF THE PREFERRED EMBODIMENTS

Figure 6:
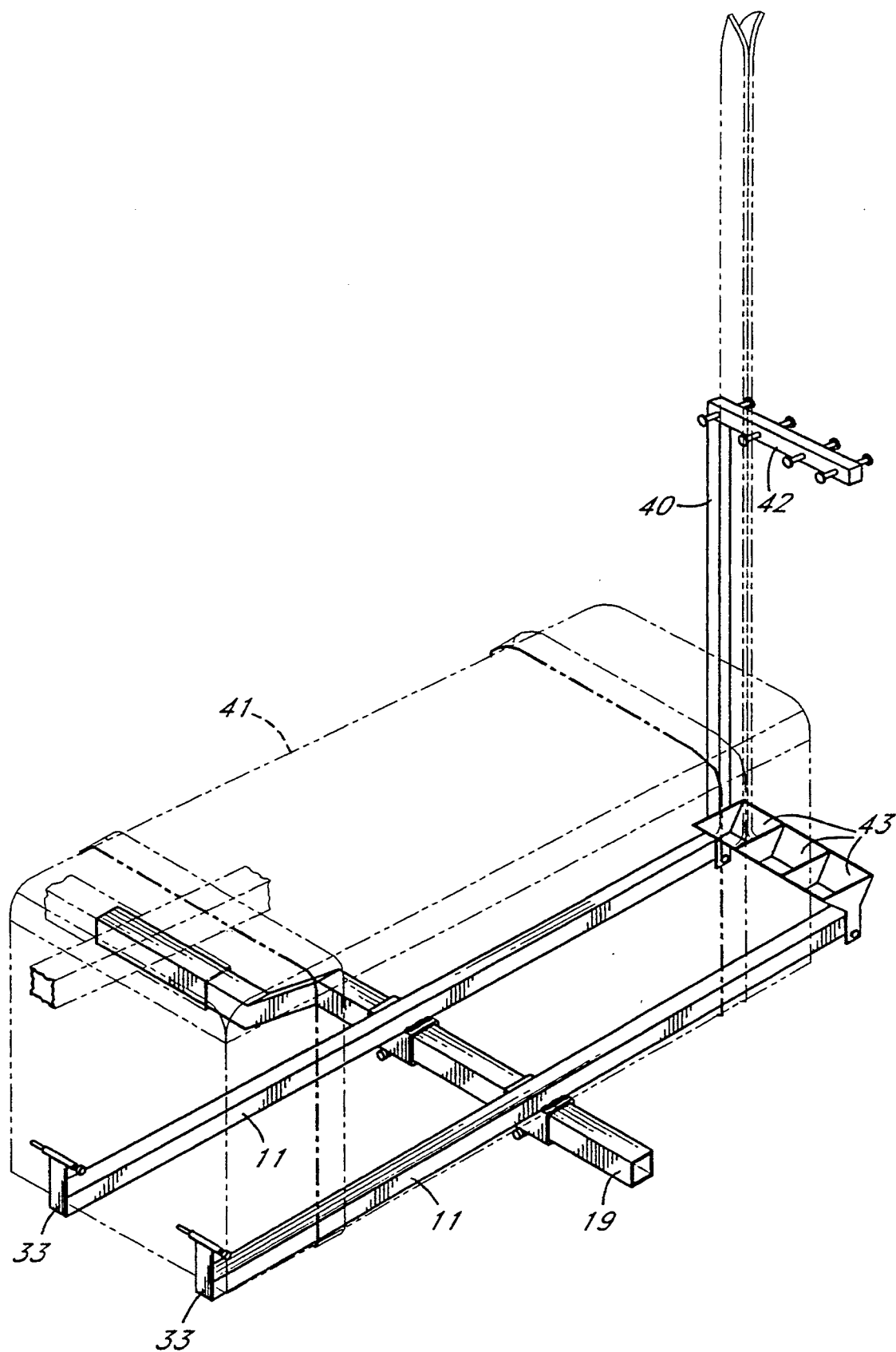
FIG. 6 is a perspective view showing a pair of support bars of the bicycle rack of FIG. 1 holding a ski rack and a storage box.

The improved bicycle rack of the present invention is shown from the rear of a vehicle to which it is affixed and indicated generally by reference character 10. Bicycle rack 10 has a support bar 11 to which a channel 12 for the rear wheel 13 of a bicycle 14 is affixed. Bicycle 14 is shown in phantom view in FIG. 1. A pair of yokes 15 are held on a shaft 16 clamped to support bar 11. A pair of threaded studs (or a bicycle quick-release) 17 are also supported on a shaft 18 held by support bar 11. As shown best in FIG. 4, it is preferable that support bar 11 be positioned at approximately 90° with respect to square supported channel 19.

Support bar 11 is removably held to a square supported channel 19, held in the trailer hitch channel 20 of trailer hitch assembly 21 shown best in FIG. 4 of the drawings by a clamp assembly 22. Clamp assembly 22 is shown in enlarged view in FIG. 2 and can be seen to have a top 23, two sides 24 and 25 and a bottom 26. Bottom 26 has a gap 27 across which tightening means 28 are placed. Tightening means 28 includes a pair of cylinders 29 and 30 through which a bolt 31 is tightened by a nut 32.

As shown best in FIG. 4, clamp assembly 22 is made from a short length of square channel. This allows the improved bicycle rack 10 to be slid to any preferred position along square supported channel 19 because clamp assembly 22 permits the support bar 11 to be securely held in a desired position. In either of two orientations, the assembly can be configured to hold bicycles as close together as possible. More specifically, support bar 11 of the innermost bicycle rack 10 shown in FIG. 4 is indicated by reference character 33 and the rear wheel end of support bar 11 is indicated by reference character 34. It can be seen by viewing FIG. 4, that rear wheel end 34 of the innermost bicycle rack 35 extends along the right side of a vehicle to which the hitch is attached whereas the rear wheel end 34 of the middle bicycle rack 36 extends from the left side of the vehicle. A third bicycle rack 37 is shown in phantom view and its rear wheel end 34 extends again from the right side so that up to four bicycle racks may be held easily on one square supported channel 19.

Preferably, the channel 12 for the rear wheel of the bicycle is removable by loosening and removing bolts 38, and similarly, the pair of yokes 15 are removable by removing bolt 39. This permits the support bar 11 to be used for holding other objects such as ski rack 40, and storage box 41 shown in phantom view in FIG. 6. Ski rack 40 has an upper clamp bar 42 and a lower ski support pocket 43. Thus, the bicycle rack of the present invention permits a wide variety of carrying jobs. It permits the vehicle owner to customize his hauling depending on the particular task at hand. The addition and removal of bicycle racks is very easy simply by loosening nut 32 and adding or removing the assembly from the supported channel.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved bicycle rack having a bicycle holding assembly including a support bar, a channel for a bicycle rear wheel held by said support bar, a pair of threaded studs held on a shaft supported by said support bar for a bicycle front fork and a pair of yokes for a bicycle front wheel also supported by said support bar, wherein the improvement comprises:

a clamp assembly on said support bar and said support bar having a top, two sides and a bottom and said clamp assembly being affixed to the bottom of said support bar and wherein said clamp assembly comprises a short length of square channel having a top affixed to the bottom of said support bar, two sides and a bottom and the bottom including a gap across which tightening means are positioned to squeeze the short length of square channel against the square supported channel;

a trailer hitch assembly having a single square hitch channel affixed to the rear of a vehicle and a single square supported channel supported within and extending rearwardly from the hitch; and at least one bicycle holding assembly with an associated support bar and said bicycle holding assembly being removably held by said clamp assembly on said square supported channel of said trailer hitch assembly and wherein the support bar is positioned at about a 90 degree angle to said square supported channel.

2. The improved bicycle rack of claim 1 wherein the channel for a bicycle rear wheel is removable from said support bar.

3. The improved bicycle rack of claim 1 wherein there are at least two clamp assemblies, each with an associated support bar and bicycle holding assembly.

4. The improved bicycle rack of claim 3 wherein said bicycle holding assemblies have a rear wheel end and a front wheel end and each bicycle holding assembly is oriented so that an adjacent bicycle holding assembly has its rear wheel end adjacent the front wheel end of an adjacent bicycle holding assembly.

5. The improved bicycle rack of claim 1 wherein said square supported channel can hold at least three clamp assemblies and associated support bars.

* * * * *